(12) United States Patent
Duggan et al.

(10) Patent No.: US 10,385,624 B2
(45) Date of Patent: Aug. 20, 2019

(54) BEND STIFFENER

(71) Applicant: Trelleborg Offshore UK Limited, Skelmersdale Lancashire (GB)

(72) Inventors: John Malachy Duggan, Skelmersdale (GB); Austin Harbison, Skelmersdale (GB)

(73) Assignee: Trelleborg Offshore UK Limited, Skelmersdale Lancashire (GB)

( * ) Notice: Subject to any disclaimer, the term of this patent is extended or adjusted under 35 U.S.C. 154(b) by 0 days.

(21) Appl. No.: 15/320,527

(22) PCT Filed: Jun. 19, 2015

(86) PCT No.: PCT/GB2015/051799
§ 371 (c)(1),
(2) Date: Dec. 20, 2016

(87) PCT Pub. No.: WO2015/193686
PCT Pub. Date: Dec. 23, 2015

(65) Prior Publication Data
US 2017/0159373 A1 Jun. 8, 2017

(30) Foreign Application Priority Data
Jun. 20, 2014 (GB) .................................. 1411077.9

(51) Int. Cl.
*E21B 17/046* (2006.01)
*E21B 43/01* (2006.01)
(Continued)

(52) U.S. Cl.
CPC ........ *E21B 17/017* (2013.01); *E21B 43/0107* (2013.01); *F16L 1/123* (2013.01); *F16L 57/005* (2013.01)

(58) Field of Classification Search
None
See application file for complete search history.

(56) References Cited

U.S. PATENT DOCUMENTS

| 6,220,303 B1 | 4/2001 | Secher et al. |
| 6,276,456 B1 * | 8/2001 | Head .................... E21B 17/015 166/350 |

(Continued)

FOREIGN PATENT DOCUMENTS

WO 2014/052331 A2 4/2014

OTHER PUBLICATIONS

Lane, M. et al, "Bend Stiffeners for Flexible Risers," Offshore Technology Conference, May 4, 1995, pp. 345-353.
(Continued)

*Primary Examiner* — Matthew R Buck
*Assistant Examiner* — Douglas S Wood
(74) *Attorney, Agent, or Firm* — Cahn & Samuels, LLP

(57) ABSTRACT

A bend stiffener for resisting excessive-bending of an elongate underwater member in a region where it meets a rigid structure, comprises: a sleeve (1) for receiving said elongate underwater member, said sleeve being capable of some degree of flexure; and a rigid interface mount (3) secured to said sleeve, said rigid interface mount being suitable for attachment to said rigid structure; wherein said rigid interface mount comprises one or more slots (4) or holes which are alignable with corresponding slots, holes or recesses on said rigid structure such that the rigid interface mount may be locked to the rigid structure by locking means (2), said locking means comprising projection(s) through the slots or holes of the rigid interface mount into the slots, holes or recesses of the rigid structure. The bend stiffener is particular suited to mid-line applications, amongst other applications.

17 Claims, 3 Drawing Sheets

(51) Int. Cl.
*F16L 35/00* (2006.01)
*F16L 57/02* (2006.01)
*E21B 41/08* (2006.01)
*F16L 1/15* (2006.01)
*E21B 17/01* (2006.01)
*F16L 1/12* (2006.01)
*F16L 57/00* (2006.01)

(56) References Cited

U.S. PATENT DOCUMENTS

| | | | |
|---|---|---|---|
| 7,387,469 B2 * | 6/2008 | Duggan | F16L 1/20 |
| | | | 405/211 |
| 7,469,722 B2 | 12/2008 | Berland | |
| 7,967,070 B2 | 6/2011 | Reddy | |
| 8,939,214 B2 * | 1/2015 | Litherland | E21B 17/015 |
| | | | 166/343 |
| 9,482,061 B2 * | 11/2016 | Latimer | E21B 17/017 |
| 2011/0226527 A1 | 9/2011 | Ritchie-Bland | |

OTHER PUBLICATIONS

European Patent Office, Written Opinion of the International Searching Authority for PCT App. No. PCT/GB2015/051799, dated Dec. 22, 2015, pp. 1-8.
European Patent Office, International Search Report for PCT App. No. PCT/GB2015/051799, dated Dec. 22, 2015, pp. 1-2.

* cited by examiner

BEND STIFFENER

This application is the National Stage of International Application No. PCT/GB2015, filed on Jun. 19, 2015, which claimed the benefit of Great Britain Application No. 1411077.9 filed Jun. 20, 2014, which are hereby both incorporated by reference.

The present invention relates to bend stiffeners for underwater use, for example bend stiffeners used in offshore oil industry operations or power generation operations.

Several issues arise from the use of elongate members (such as for example risers, cables, umbilicals and other tubular structures and conduits) under water, due to the movement of such members and forces and loads exerted upon and by them. It is important to control or restrict bending, flexing or kinking at various locations, and bend stiffeners are typically designed to provide increased bend stiffness at the points where a flexible elongate member (e.g. a tube) meets a supporting structure, such as a subsea riser base or the turret exit of a floating production vessel.

Such bend stiffeners commonly comprise an elongate sleeve which has an outer frusto-conical surface and an inner cylindrical channel for surrounding the flexible elongate member. The sleeve is made from a compliant yet resilient e.g. moulded material such as an elastomer, and is capable of some degree of flexure, albeit less flexure than the member it surrounds. Due to its shape, i.e. its variation in wall thickness, it becomes less stiff from the route towards the tip. Thus, at the root end, i.e. the point of attachment to the supporting structure, the walls of the elastomeric sleeve are thickest and therefore the product is stiffest.

Known bend stiffeners typically include steelwork at the root end of the sleeve. Such steelwork acts as a rigid interface mount to secure the bend stiffener to a rigid or supporting structure. It is attached to the sleeve and is attachable to the supporting structure. Flanges, in the form of a series of bolts or studs arranged in a circular pattern, and toruses, to provide considerable mechanical locks between sleeves and steelwork, are commonly used.

Whilst it is important to increase bend stiffness at the ends of flexible risers or other elongate members, bending and loading issues can also arise in other locations. Risers and other elongate members are produced in certain lengths and therefore it may be necessary to join several together.

We have developed a new bend stiffener which is particularly useful in an intermediate (mid-line) location, i.e. part way along a flexible riser or other elongate member, for example where lengths of riser are joined together. Nevertheless this product may also be used in terminal locations.

The present invention provides a bend stiffener for resisting excessive bending of an elongate underwater member in a region where it meets a rigid structure, the bend stiffener comprising:
 a sleeve for receiving said elongate underwater member,
  said sleeve being capable of some degree of flexure, and
 a rigid interface mount secured to said sleeve,
  said rigid interface mount being suitable for attachment to said rigid structure,
 wherein said rigid interface mount comprises one or more slots or holes which are alignable with corresponding slots, holes or recesses on said rigid structure such that the rigid interface mount may be locked to the rigid structure by locking means,
  said locking means comprising projection(s) through the slots or holes of the rigid interface mount into the slots, holes or recesses of the rigid structure.

The way in which the bend stiffener of the present invention connects to a rigid structure differs from conventional approaches which typically use a flange with a circular set of bolts. The present invention therefore reduces complexity and the need for welding.

The degree of flexure may be provided by a sleeve made from compliant, resilient material, such as polymers known in the art for this purpose, e.g. elastomers. The sleeve has a through-going channel for the elongate member and suitably the sleeve may be frusto-conical, or may alternatively be of other suitable shape, e.g. other shape which has thicker walls at its root compared to its tip.

The rigid interface mount may suitably be a metallic structure. The shape of the rigid interface mount may be tubular and the mount may be attached to the root end of the sleeve so that the elongate member may pass axially through the sleeve and rigid interface mount.

The rigid interface mount may be secured to the sleeve by engagement of the material (e.g. elastomeric material) of the latter into slots, holes or recesses on the former. This in effect provides a mechanical lock between the material of the sleeve and the rigid interface mount.

The rigid interface mount may be part-moulded into the root of the sleeve so as to form a securely adhered product.

The simplicity of the design of the present invention can be contrasted with known bend stiffeners which comprise complex steelwork and which require bolting to a flange or bonding to polyurethane or other elastomeric material. The present invention also avoids the need to include a torus to secure the steelwork to the sleeve, and this in turn means that the cone's root diameter can be smaller than would be required with a torus. The holes or slots in the steelwork of the bend stiffener of the present invention are particularly effective in allowing the steelwork to strongly interlock with the polyurethane or other sleeve material.

The rigid interface mount suitably has a tubular cylindrical or part-cylindrical inner surface such that it may act as a female member to fit over a corresponding male member on the rigid structure (or vice-versa). In this way this way the tubular member of the bend stiffener may slide with a close fit over the end fitting of the rigid structure.

The projections (which pass through the slots or holes of the rigid interface mount into the slots, holes or recesses of the rigid structure) of the locking structure may be provided by way of a clamp and/or a split ring. These projections thus act as a key to secure the bend stiffener to the rigid structure. Thus, for example, a clamp may fit around the circumference of the rigid interface mount and may comprise two halves which may be bolted together, with a projection on each half. Of course, a different number of projections may be provided so long as the effect is to securely fasten the bend stiffener to the rigid structure. Suitably the projections extend radially inwardly, i.e. perpendicularly or at least partially perpendicularly compared to the longitudinal direction of the tubular or elongate direction.

In this way the bending moment and shear force is transferred from the elastomer (or other sleeve material) via the rigid interface mount into the end fitting of the rigid structure.

In mid-line or intermediate use, two bend stiffeners of the present invention are attached, via their rigid interface mounts, to a central rigid structure Thus, from a further aspect, the present invention provides an apparatus comprising a pair of bend stiffeners and a central unit, wherein each bend stiffener is suitable for resisting excessive bending of an elongate underwater member in a region where it meets said central unit, each bend stiffener comprising:
 a sleeve for receiving an elongate underwater member, said sleeve being capable of some degree of flexure, and
 a tubular rigid interface mount secured to said sleeve, said tubular rigid interface mount being suitable for mating attachment to a tubular rigid part of the central unit.

The elegant design of the present invention is particularly suited to mid-line application, in part because the mid-line loads are generally lower than terminal loads. The simpler construction enabled by the present invention permits considerable cost savings. In particular, the use of a tubular metal component as the rigid interface mount, and a thinner stiffener (i.e. thinner frustoconical sleeve, or at least one which thinner at its root than known stiffeners), is very cost-effective.

As noted above, the rigid interface mount is advantageously tubular (e.g. cylindrical). Therefore, the rigid structure with which it mates is also advantageously tubular (e.g. cylindrical) so that one can fit within the other. Such telescopic mating of one tube on top of the other results in a product which allows for the translation of bending moments and shear force from the tube of the bend stiffener onto the tube of the rigid structure. This is more effective than bolting a flange of a rigid interface mount onto a rigid structure. The tubes overlap or mate over a particular length thereby spreading the load over an area rather than a particular point. Preferably the tubes mate closely so as to further enhance the strength of the linkage and further enhance the transfer of the load.

Reference is made herein to "locking" of one tube to the other. This "locking" keeps one tube fixed relative to the other but does not involve significant load or force: rather the strength of the connection resides predominantly in the mating of one tube in another.

Reference is also made herein to slots, holes or recesses in one tube being aligned with slots, holes or recesses in the other, so that locking means may work by passing through both. Whilst this is convenient, effective and preferred, it is not essential, and it is possible for the two mating tubes to be held together by other means.

The present invention will now be described in further non-limiting detail, and by way of example only, with reference to the following figures in which.

Figure 1:
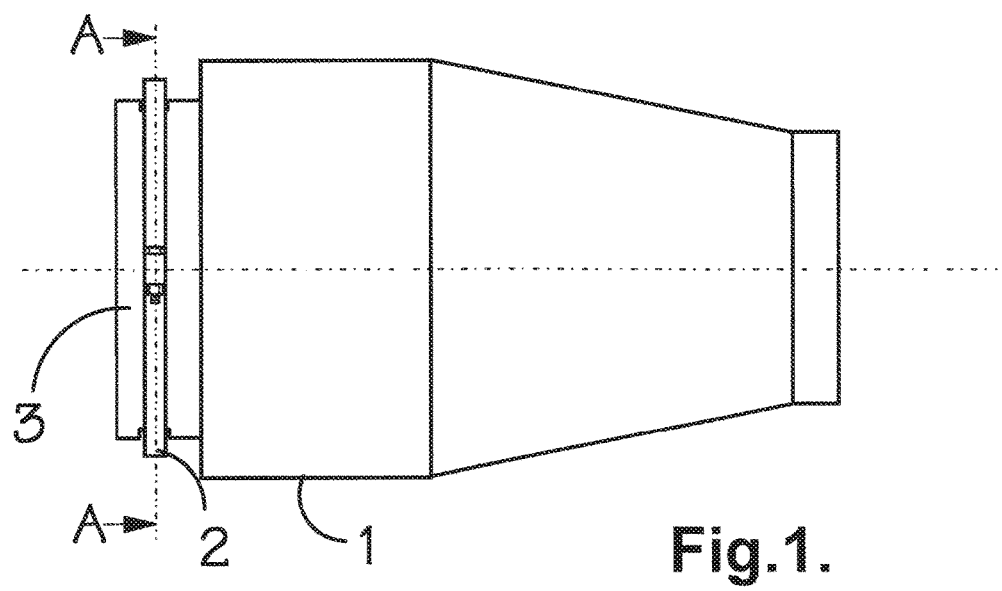
FIG. 1 is a schematic illustration of one embodiment of a bend stiffener in accordance with the present invention.
Figure 2:
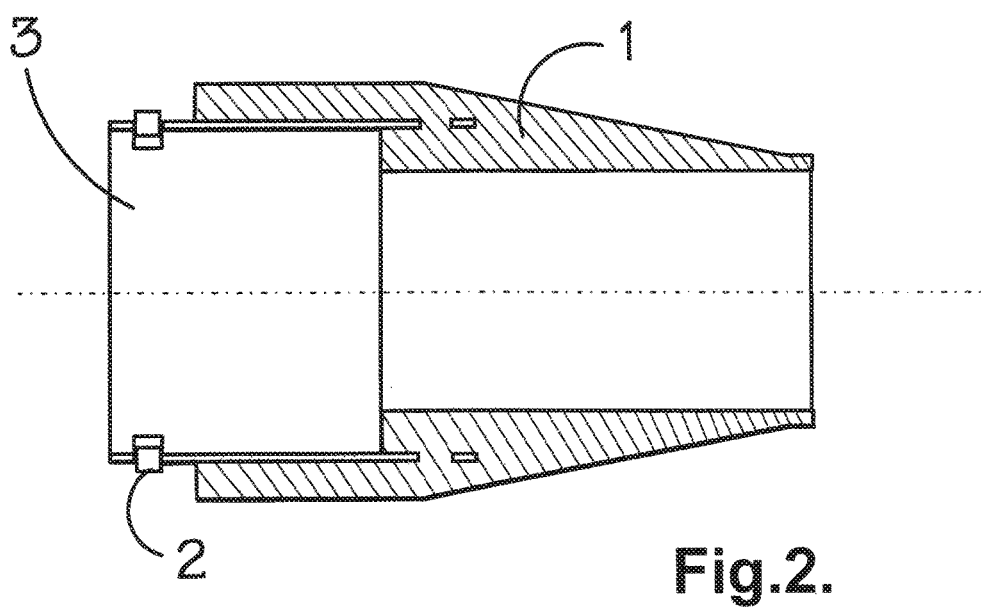
FIG. 2 is a cross-sectional view of the bend stiffener of FIG. 1.
Figure 3:
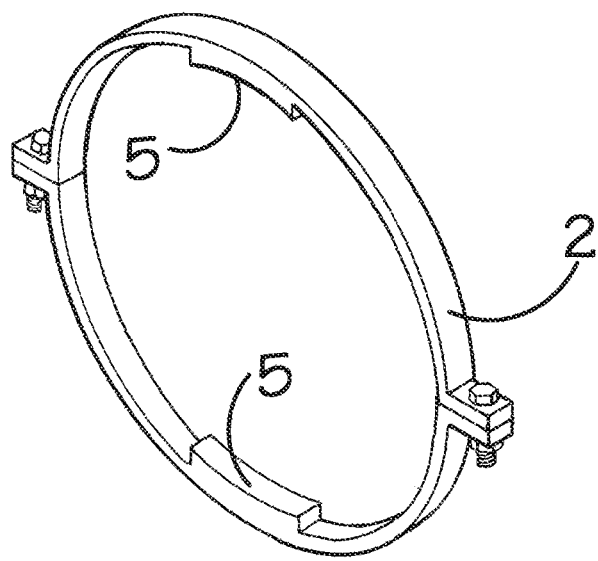
FIG. 3 shows one possible embodiment of a split ring for use as the locking means referred to herein.
Figure 4:
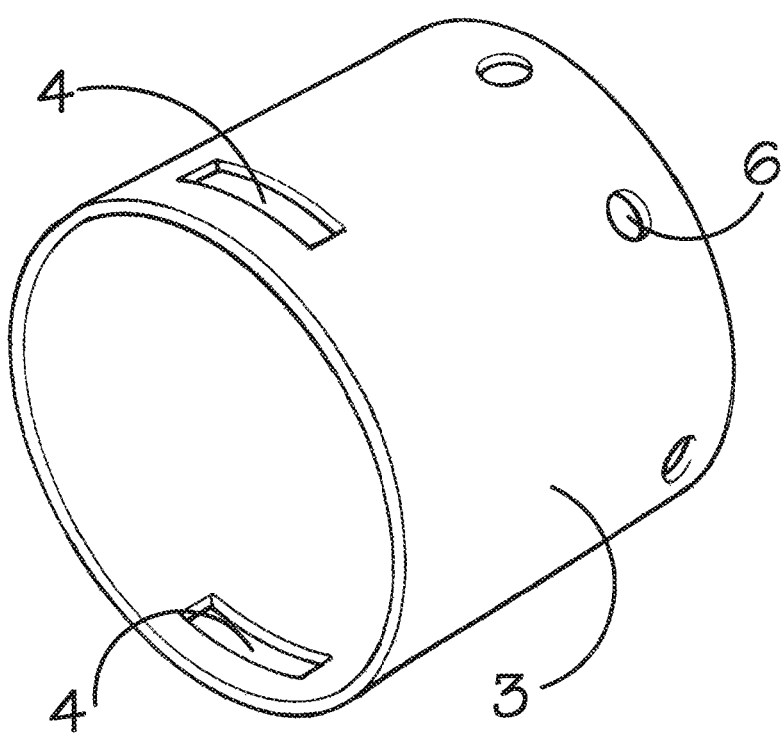
FIG. 4 shows one embodiment of a rigid interface mount which can form part of a bend stiffener in accordance with the present invention.
Figure 5:
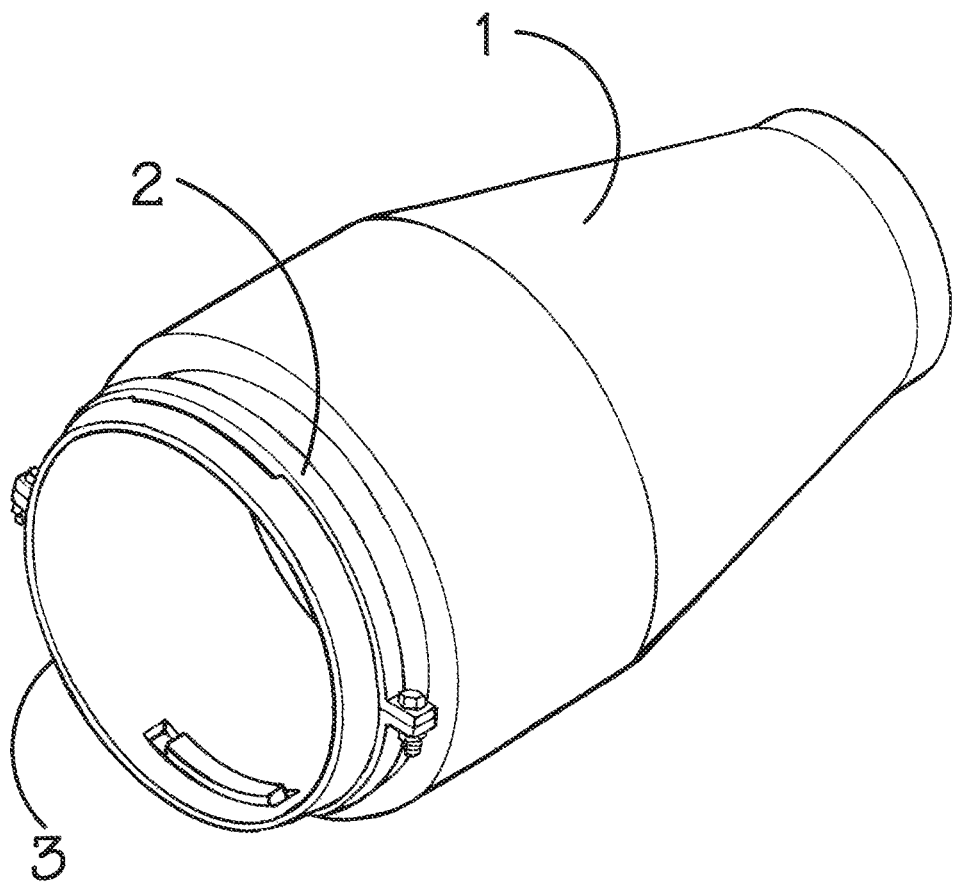
FIG. 5 shows a schematic representation of a bend stiffener in accordance with one embodiment of the present invention.

In the embodiment illustrated in FIG. 1, rigid interface mount 3 in the form of a tubular metal structure (the tubular shape is shown most clearly in FIG. 4) is partially embedded within sleeve 1 which is a frustoconical structure (shown most clearly in FIGS. 1 and 2) formed of elastomeric moulded material. The elastomeric moulded material is moulded around, and through, holes 6 (shown in FIG. 4) in rigid interface mount 3.

Rigid interface mount 3 also has slots 4 into which projections 5 on locking means 2 may extend. These projections 5 extend further through slots 4 than the inner surface of tubular member 3 such that they can also engage recesses in a rigid structure (not shown) to thereby attach the bend stiffener to the rigid structure.

It will be seen from the figures that whilst the elastomeric sleeve 1 may partly have a frusto-conical shape, it may also comprise a cylindrical portion particularly in the vicinity of where the rigid interface mount is embedded.

It should also be noted that the figures show merely certain embodiments and only in a schematic manner. Other embodiments and arrangements are possible and fall within the scope of the present claims.

The invention claimed is:

1. A bend stiffener for resisting excessive bending of an elongate underwater member, the bend stiffener comprising:
 a sleeve for receiving said elongate underwater member, said sleeve being capable of some degree of flexure,
 a rigid interface mount secured to said sleeve, said rigid interface mount being tubular having at least one slot or hole, and
 a clamp configured to be fitted around a circumference of said rigid interface mount, said clamp having a split ring carrying at least one radially inwardly directed locking projection insertable in the at least one slot or hole; and
 wherein said bend stiffener is able to be mounted and locked to an end fitting of a further structure by sliding said rigid interface mount into or onto the end fitting, aligning the at least one slot or hole of said rigid interface mount with at least one corresponding slot, hole or recess of the end fitting, and
 said clamp capable of being secured around the exteriors of said rigid interface mount and said end fitting with said at least one locking projection of said clamp extending through or into the at least one slot or hole of said rigid interface mount and the corresponding at least one slot, hole or recess of the end fitting.

2. A bend stiffener as claimed in claim 1 which is a mid-line bend stiffener.

3. A bend stiffener as claimed in claim 1, wherein the sleeve is an elastomeric material having, at least in part, a frusto-conical shape.

4. A bend stiffener as claimed in claim 1, wherein said sleeve is moulded and said rigid interface mount is at least partially embedded within said sleeve.

5. A bend stiffener as claimed in claim 1, wherein said split ring clamps around the exteriors of said rigid interface mount and the end fitting when mounted.

6. A bend stiffener as claimed in claim 1, said split ring having two clamp halves securable to one another to form a continuous ring.

7. A bend stiffener as claimed in claim 6, wherein each of said clamp halves includes one of said at least one radially inwardly directed locking projection.

8. A bend stiffener as claimed in claim 7, wherein each locking projection extends from an interior surface of said clamp half towards the other clamp half.

9. A bend stiffener as claimed in claim 1, said split ring forms a continuous ring.

10. A bend stiffener as claimed in claim 1, wherein said locking projections are removable from the at least one slot or hole of said rigid interface mount.

11. A bend stiffener as claimed in claim 1, wherein each locking projection extends from an interior surface of said split ring towards an opposing side of said split ring.

12. A bend stiffener as claimed in claim 1, wherein said clamp is separate from and attachable to said rigid interface mount and the end fitting.

13. A bend stiffener for resisting excessive bending of an elongate underwater member, the bend stiffener consisting of:
    a sleeve for receiving said elongate underwater member, said sleeve being capable of some degree of flexure
    a rigid interface mount secured to said sleeve, said rigid interface mount being tubular having at least one slot or hole, and
    a clamp configured to be fitted around a circumference of said rigid interface mount, said clamp including two clamp halves securable to one another to form a continuous ring, each clamp half having at least one locking projection insertable in the at least one slot or hole of said rigid interface and extending radially inwardly from an interior surface of said clamp half; and
    wherein said bend stiffener is able to be mounted and locked to an end fitting of a further structure by sliding said rigid interface mount into or onto the end fitting, aligning the slots or holes of said rigid interface mount with corresponding slots, holes or recesses of the end fitting, and
    said clamp capable of being secured around the exteriors of said rigid interface mount and the end fitting with each of said locking projections of said clamp extending through or into the at least one respective slot or hole of said rigid interface mount and the corresponding slot, hole or recess of the end fitting.

14. A bend stiffener for resisting excessive bending of an elongate underwater member, the bend stiffener consisting essentially of:
    a sleeve for receiving said elongate underwater member, said sleeve being capable of some degree of flexure, and
    a rigid interface mount secured to said sleeve, said rigid interface mount being tubular having at least one slot or hole, and
    a clamp configured to be fitted around a circumference of said rigid interface mount, said clamp having at least one radially inwardly directed locking projection insertable in the at least one slot or hole,
    wherein said bend stiffener is able to be mounted and locked to an end fitting of a further structure by sliding said rigid interface mount into or onto the end fitting, aligning the at least one slot or hole of said rigid interface mount with at least one corresponding slot, hole or recess of the end fitting, and
    said clamp capable of being secured around the exteriors of said rigid interface mount and said end fitting with said at least one locking projection of said clamp extending through or into the at least one slot or hole of said rigid interface mount and the corresponding slot, hole or recess of the end fitting.

15. A bend stiffener as claimed in claim 14, wherein said sleeve is an elastomeric material having a frusto-conical shape.

16. A bend stiffener as claimed in claim 14, wherein said clamp includes a split ring which clamps around and forms a continuous ring around said rigid interface mount.

17. A bend stiffener as claimed in claim 14, wherein said clamp including two clamp halves securable to one another to form a continuous ring, each clamp half having one of said at least one radially inwardly directed locking projection extending from an interior surface of said clamp half.

* * * * *